United States Patent
Kang

(10) Patent No.: US 10,250,047 B2
(45) Date of Patent: Apr. 2, 2019

(54) BATTERY DISCONNECT UNIT

(71) Applicant: LSIS CO., LTD., Gyeonggi-do (KR)

(72) Inventor: Sungsoo Kang, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 149 days.

(21) Appl. No.: 15/214,374

(22) Filed: Jul. 19, 2016

(65) Prior Publication Data

US 2017/0025872 A1    Jan. 26, 2017

(30) Foreign Application Priority Data

Jul. 20, 2015    (KR) .................. 20-2015-0004886 U

(51) Int. Cl.
*B60L 3/00* (2019.01)
*B60L 3/04* (2006.01)
(Continued)

(52) U.S. Cl.
CPC .......... *H02J 7/0031* (2013.01); *B60L 3/0046* (2013.01); *B60L 3/0092* (2013.01); *B60L 3/04* (2013.01);
(Continued)

(58) Field of Classification Search
CPC ... H02J 7/0031; H02J 7/0091; B60L 11/1872; B60L 11/1879; B60L 3/0046;
(Continued)

(56) References Cited

U.S. PATENT DOCUMENTS 2,442,445 A    6/1948   Toelle
2005/0231320 A1*  10/2005  Ackermann ........... H01H 9/168
                                                                337/206
(Continued)

FOREIGN PATENT DOCUMENTS

CN    101103509 A    1/2008
DE    102012001861 A1   9/2012
(Continued)

OTHER PUBLICATIONS

Office Action dated Jun. 6, 2017 for Japanese Application No. No. 2016-141565, in 3 pages.
(Continued)

*Primary Examiner* — Drew A Dunn
*Assistant Examiner* — Sailesh Thapa
(74) *Attorney, Agent, or Firm* — K&L Gates LLP

(57) ABSTRACT

Disclosed embodiments relate to a battery disconnect unit capable of being stably driven, and minimizing damage of a circuit, by including a means to protect the circuit at high temperatures without an additional power source. In some embodiments, the battery disconnect unit includes a first main relay electrically connected between a first pole of a battery and an inverter; a second main relay electrically connected between a second pole of the battery and the inverter; a pre-charge relay connected to the second main relay in parallel; and a self-operating switch connected between the first pole of the battery and the second main relay, and configured to autonomously open a circuit providing an electric power from the battery when a ambient temperature is drastically increased, or when an over-current occurs.

7 Claims, 3 Drawing Sheets

(51) Int. Cl.
*H02J 7/00* (2006.01)
*B60L 11/18* (2006.01)

(52) U.S. Cl.
CPC ....... *B60L 11/1803* (2013.01); *B60L 11/1851* (2013.01); *B60L 11/1872* (2013.01); *B60L 11/1879* (2013.01); *H02J 7/0091* (2013.01); *B60L 2240/36* (2013.01); *B60L 2240/545* (2013.01); *H01M 2200/00* (2013.01); *H01M 2200/103* (2013.01); *H01M 2220/20* (2013.01); *Y02T 10/7005* (2013.01); *Y02T 10/705* (2013.01)

(58) Field of Classification Search
CPC ...... B60L 11/1851; B60L 3/04; B60L 3/0092; B60L 11/1803; B60L 2240/36; Y02T 10/7005; Y02T 10/705; H01M 2220/20; H01M 2200/103
See application file for complete search history.

(56) References Cited

U.S. PATENT DOCUMENTS

| | | | |
|---|---|---|---|
| 2010/0277845 A1 | 11/2010 | Park et al. | |
| 2015/0229011 A1* | 8/2015 | Gless | B60L 11/1874 62/3.2 |
| 2015/0229144 A1* | 8/2015 | Jang | H02H 7/18 320/134 |
| 2015/0231976 A1* | 8/2015 | Byun | B60L 11/185 320/109 |
| 2016/0205761 A1* | 7/2016 | Dede | H01L 23/36 361/717 |

FOREIGN PATENT DOCUMENTS

| | | | |
|---|---|---|---|
| DE | 102012215056 A1 | | 2/2014 |
| JP | 2004-102311 A | | 4/2004 |
| JP | 2005-124329 A | | 5/2005 |
| JP | 2007-6559 A | | 1/2007 |
| JP | 2013-74707 A | | 4/2013 |
| KR | 20050015387 | | 2/2005 |
| KR | 20100080212 | * | 7/2010 |
| KR | 20110040063 | | 4/2011 |
| KR | 101103616 | | 1/2012 |
| KR | 20130083528 | * | 7/2013 |
| KR | 20130083528 A | | 7/2013 |
| KR | 20140070148 | | 6/2014 |
| KR | 20140072522 | | 6/2014 |

OTHER PUBLICATIONS

Search Report from Korean Application No. 02-6915-6308 dated Oct. 8, 2015 in 3 pages.
Extended European Search Report for Application No. EP16178686 dated Oct. 25, 2016 (8 pages).
Chinese Patent Office, Office Action issued in Chinese Patent Application No. 201610556326.1 (related to above-captioned patent application), dated Dec. 29, 2018.

* cited by examiner

BATTERY DISCONNECT UNIT

CROSS-REFERENCE TO RELATED APPLICATIONS

This application claims the benefit of Korean Application No. 20-2015-0004886, filed on Jul. 20, 2015, which is hereby incorporated by reference in its entirety.

BACKGROUND

Technical Field

The present disclosure relates to a battery disconnect unit, and more particularly, to a battery disconnect unit including a protection means operated according to a ambient temperature even in a standby state without an electric power source.

Background

An electric vehicle means a car using electricity, and may be classified into a battery powered electric vehicle and a hybrid electric vehicle. The battery powered electric vehicle means a car using only electricity, and the hybrid electric vehicle means a car using electricity and fossil fuel.

A driving system provided in such an electric vehicle includes a battery configured to supply a direct current (DC) electric power (abbreviated as power hereinafter) as a driving energy for driving an electric vehicle; a battery disconnect unit (BDU) controlled by a controller so as to be on a circuit closing position for supplying the DC power from the battery, or a circuit opening position for interrupting the supply of the DC power; an inverter configured to convert the DC power supplied from the battery disconnect unit into an alternating current (AC) power, and configured to supply the AC power; and a motor driven by the AC power provided from the inverter, and configured to provide a rotation driving force for rotating wheels of the vehicle.

FIG. 1 is a block diagram schematically illustrating a configuration of a driving system for an electric vehicle including a battery disconnect unit, in accordance with the prior art.

Referring to FIG. 1, the conventional driving system for an electric vehicle includes a battery disconnect unit 10 having a plurality of relays, etc., a battery 20, an inverter 30, and a motor 40.

The battery disconnect unit 10 includes main relays 11, 12, a pre-charge relay 14, a pre-charge resistor (R) and a capacitor (C).

The first and second main relays 11, 12 are configured to supply an electric power or interrupt power supply, between the battery 20 and the inverter 30.

The pre-charge relay 14 and the pre-charge resistor (R) are configured to prevent damage of the second main relay 12 due to input of an inrush current generated when the vehicle is started.

The capacitor (C) is configured to supply a DC constant voltage to the inverter 30.

The battery disconnect unit 10 may further include a fuse (F). The fuse (F) melts to be cut-out when an over-current flows to a circuit, thereby protecting the battery disconnect unit 10 and components of the driving system from the over-current.

Hereinafter, will be explained an operation of the driving system for an electric vehicle, the driving system including the battery disconnect unit 10.

Firstly, when the vehicle is started, the first main relay 11 turns firstly into a closed state (turn on state) by the controller (not shown). Then, the pre-charge relay 14 turns into a closed state by the controller.

Then, if the capacitor (C) is completely charged as a predetermined time lapses, the pre-charge relay 14 turns into an open state (turn off state) by the controller. And the first main relay 11 and the second main relay 12 turn into a closed state. As a result, a DC power from the battery 20 is supplied to the inverter 30 through the first and second main relays 11, 12.

Accordingly, an AC power converted from the DC power by the inverter 30 is supplied to the motor 40, and the motor 40 is driven. As a result, the vehicle may be driven.

Since the second main relay 12 is in an open state while the capacitor (C) is being charged, damage of the second main relay 12 due to an inrush current generated when the vehicle is started, may be prevented.

Then, if a starting key of the vehicle is manipulated to be on a start stopping position, or if the vehicle is stopped, the first and second main relays 11, 12 turn into an open state by the controller. Accordingly, when the vehicle is not running, a connected state between the battery 20 and the inverter 30 is not maintained. This may prevent DC power from the battery 20 from inverting (DC-AC) and from being transmitted to the motor 40.

Then, if the vehicle is re-driven, the pre-charge relay 14 turns into a closed state by the controller. Accordingly, a current from the battery 20 is reduced by the pre-charge resistor (R) to thus be applied to the pre-charge relay 14. As a result, the capacitor (C) connected to the pre-charge relay 14 starts to be charged. If the capacitor (C) is charged much enough to apply a constant DC voltage to the inverter 30, the first and second main relays 11, 12 turn into a closed state by the controller, and the pre-charge relay 14 turns into an open state by the controller.

However, the aforementioned battery disconnect unit 10 has only a function to prevent damage of the first and second main relays 11, 12 due to an inrush current generated when the vehicle is started, and does not have a device for protecting a circuit thereof from an ambient temperature rise. Accordingly, there has been proposed a method capable of preventing damage of a circuit due to a high temperature, by installing a thermo-coupler, etc in the battery disconnect unit 10. However, such a method required an additional circuit for recognizing and controlling a temperature, and it is performed only when there is an additional electric power to operate the thermo-coupler.

Generally, functions of electronic products can be executed normally at a temperature range of −40° C.~85° C. If a ambient temperature of the battery disconnect unit exceeds 85° C. (a high temperature limiting value), a normal operation of the main relays and the pre-charge relay is difficult to be expected. However, a power supplying of the conventional battery disconnect unit is not interrupted even when a ambient temperature thereof is maintained at more than 85° C. This may cause damage of a circuit of the battery disconnect unit, and may cause a vehicle controller not to be operated normally.

That is, the conventional battery disconnect unit is not provided with a protection device to protect electric components thereof against an excessive increase of a ambient temperature. This may cause damage of components and peripheral electric components of the battery disconnect unit, when a ambient temperature of the battery disconnect unit is excessively increased.

SUMMARY

Therefore, an aspect of some embodiments of the present disclosure is to provide a battery disconnect unit capable of protecting electric components and peripheral electric components thereof, by autonomously interrupting a power supplying from a battery without an additional power source, when an over-current is generated or when the battery disconnect unit is at an extra ordinary high temperature atmosphere.

To achieve these and other advantages and in accordance with the purpose of this specification, as embodied and broadly described herein, there is provided a battery disconnect unit comprising:
- a first main relay electrically connected between a first pole of a battery and an inverter;
- a second main relay electrically connected between a second pole of the battery and the inverter;
- a pre-charge relay connected to the second main relay in parallel; and
- a self-operating switch connected between the first pole of the battery and the second main relay, and configured to autonomously open a circuit providing an electric power from the battery when a ambient temperature is drastically increased (such as, when the ambient temperature reaches or exceeds a temperature threshold), or when an over-current occurs (such as, when the current reaches or exceeds a current threshold).

According to an aspect of some embodiments of the present disclosure, the self-operating switch may be configured with a bimetal switch open at a predetermined temperature or at more than the predetermined temperature.

According to another aspect of some embodiments of the present disclosure, the battery disconnect unit further comprises a substrate connected to the self-operating switch, formed of a material including an excellent thermal conductivity, and configured to accelerate a circuit opening speed of the self-operating switch when temperature increase occurs.

According to still another aspect of some embodiments of the present disclosure, the substrate is configured with a copper plate According to still another aspect of some embodiments of the present disclosure, t the substrate is configure with a fine silver plate.

According to still another aspect of some embodiments of the present disclosure, the battery disconnect unit further comprises a relay state output terminal connected across both ends of contacts of each of the first main relay, the second main relay and the pre-charge relay, and configured to transmit a switching state information of each of the first main relay, the second main relay and the pre-charge relay.

According to still another aspect of some embodiments of the present disclosure, the battery disconnect unit may further comprises a fuse disposed between the battery and the inverter, and formed to melt when an over-current occurs on a circuit inside the battery disconnect unit; and a fuse state output terminal connected to the fuse, and configured to output an information signal indicating whether the fuse includes melted or not.

Further scope of applicability of the present application will become more apparent from the present disclosure given hereinafter. However, it should be understood that the present disclosure and specific examples, while indicating embodiments of the disclosure, are given by way of illustration only, since various changes and modifications within the spirit and scope of the disclosure will become apparent to those skilled in the art from the present disclosure.

BRIEF DESCRIPTION OF THE DRAWINGS

The accompanying drawings, which are included to provide a further understanding of the disclosure and are incorporated in and constitute a part of this specification, illustrate embodiments and together with the description serve to explain the principles of the disclosure.

In the drawings.

DETAILED DESCRIPTION

Description will now be given in detail of configurations of a battery disconnect unit according to the present disclosure, with reference to the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. When an element is referred to as being "directly connected with" another element, there may be no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
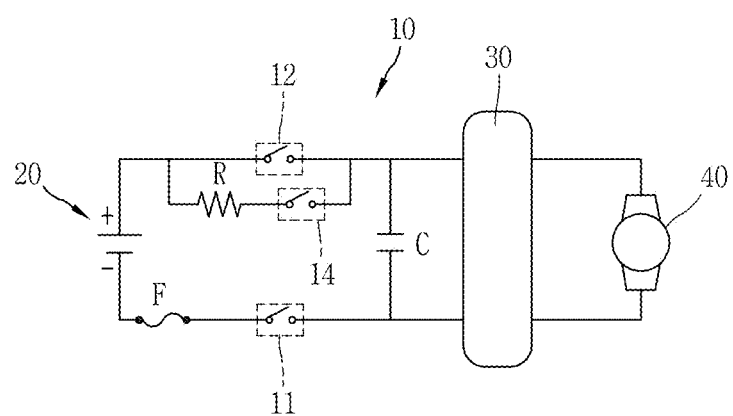
FIG. 1 is a block diagram schematically illustrating a configuration of a driving system for an electric vehicle including a battery disconnect unit, in accordance with the prior art.
Figure 2:
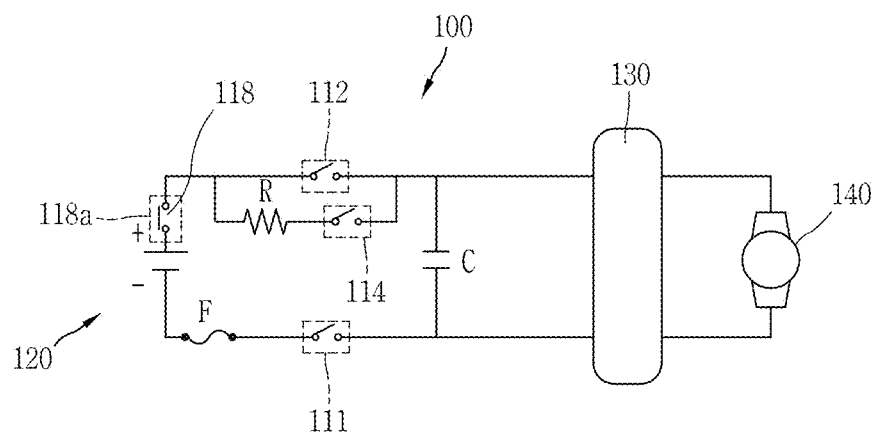
FIG. 2 is a block diagram illustrating a configuration of a circuit of a battery disconnect unit according to some embodiments.
Figure 3:
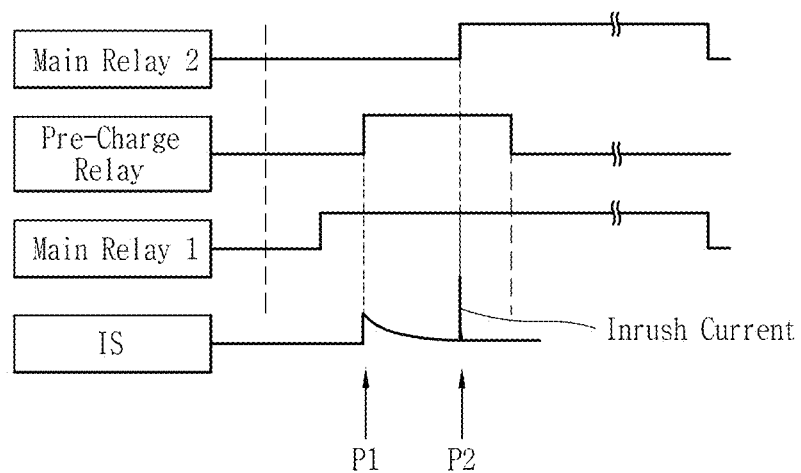
FIG. 3 is a waveform diagram illustrating signal waveforms applied to relays in FIG. 2, according to some embodiments.

FIG. 2 is a block diagram illustrating a configuration of a circuit of a battery disconnect unit according to some embodiments, and FIG. 3 is a waveform diagram illustrating waveforms of signals applied to relays of FIG. 2 according to some embodiments.

Referring to FIGS. 2 and 3, a driving system for an electric vehicle comprises a battery 120, an inverter 130 and a motor 140. In the driving system, a battery disconnect unit 100 according to some embodiments of the present disclosure is connected between the battery 120 and the inverter 130. And the battery disconnect unit 100 may be controlled by a controller (not shown) {e.g., a controller of a Battery Managing System (not shown)}, so as to be on a closed position for supplying a DC power from the battery 120 to the inverter 130, or an open position for interrupting the supply of the DC power.

The battery disconnect unit 100 according to some embodiments of the present disclosure comprises a first main relay 111, a second main relay 112, a pre-charge relay 114, a pre-charge resistor (R), a capacitor (C), a fuse (F) and a self-operating switch 118.

The first main relay 111 is connected between a minus terminal (in other words "a first pole" or "a cathode") of the battery 120 and the inverter 130, and is configured to supply a DC power of the battery 120 to the inverter 130, or to interrupt the power supply. As shown in FIG. 3, when the vehicle is driven, the first main relay 111 is in a closed state under control of the controller (not shown).

The second main relay 112 is connected between a plus terminal (in other words "a second pole" or "an anode") of the battery 120 and the inverter 130, and is configured to supply a DC power of the battery 120 to the inverter 130, or to interrupt the power supply.

Referring to FIG. 2, the pre-charge relay 114 and the pre-charge resistor (R) are connected to the second main relay 112 in parallel.

As the pre-charge relay 114 is in a closed state by a control signal (see a pulse signal starting time point P1 in FIG. 3) of the controller (not shown), the capacitor (C) is charged by a DC provided from the battery 120. And generated is a path along which the DC flows to the inverter 130 from the plus terminal of the battery 120, via the pre-charge relay 114 and the pre-charge resistor (R).

After the closed state (the high level state) is maintained for a predetermined time as shown in FIG. 3, the pre-charge relay 114 is in an open state (the low level state) as the supply of the control signal of the controller (not shown) is interrupted.

Referring to FIG. 3, while the pre-charge relay 114 is in a closed state by the control signal of the controller (not shown), an inrush current generated when the vehicle is started does not flow through the second main relay 112 which is in an open state, but flows through the pre-charge relay 114 and the pre-charge resistor (R) for current limiting.

Once the second main relay 112 turns into a closed state ('ON' state) at a time point indicated by P2 in FIG. 3 by the control signal of the controller, the DC from the battery 120 flows to the inverter 130.

The pre-charge relay 114 charges the capacitor (C) by being in a closed state after the first main relay 111 is in a closed state when the vehicle is started. And the pre-charge relay 114 and the pre-charge resistor (R) provides a conducting path such that an inrush current flows therethrough for a short time when the vehicle is started, thereby preventing damage of the second main relay 112 due to the inrush current.

The fuse (F) melts to be cut-out when an over-current flows thereon, thereby protecting the battery disconnect unit and the driving system for an electric vehicle according to some embodiments of the present disclosure from the over-current.

The self-operating switch 118 is connected between the plus terminal of the battery 120 and the second main relay 112, thereby opening the circuit when a ambient temperature of the battery disconnect unit 100 is increased by not less than a predetermined value, or when the fuse (F) is not disconnected (not melt) despite an over-current applied thereto (e.g., a mis-assembly of the fuse, or an inferior state of the fuse).

Further, the self-operating switch 118 may protect the fuse (F) by opening the circuit firstly than the fuse (F) even when an over-current less than an operating current of the fuse (F) occurs.

Generally, a performance of the battery disconnect unit 100 can be guaranteed at a temperature range of −40° C.~85° C. At a temperature more than 85° C. (high temperature), the main relays 111, 112, the pre-charge relay 114 and a current sensor (not shown) cannot be guaranteed to normally operate. Thus, the self-operating switch 118 of some embodiments of the present disclosure autonomously turns into open state (off state) without any supply of an electric power at a temperature not less than a predetermined temperature value (e.g., 85° C.), and without being controlled by an additional controller, thereby opening the circuit. As a result, the self-operating switch 118 protects electric components of the battery disconnect unit 100, or electric components included in the driving system for an electric vehicle.

The self-operating switch 118 may be configured as a bimetal switch according to some embodiments of the present disclosure. In this case, the self-operating switch 118 may be operated according to a temperature, thereby protecting the electric components of the battery disconnect unit 100 and the electric components included in the driving system for an electric vehicle, even when the battery disconnect unit 100 is in a standby state not a driving state.

According to another aspect of some embodiments of the present disclosure, the bimetal switch serving as the self-operating switch 118 may be coupled to a copper plate 118a including a high thermal conductivity as a substrate. This is in order to accelerate a reaction speed through the copper plate 118a including a high thermal conductivity, because it takes a predetermined time for the bimetal switch to be operated by reacting with a ambient temperature. As shown in FIG. 2, the copper plate 118a serving as a substrate is electrically connected to a conducting line connected from the plus terminal of the battery 120 to the battery disconnect unit 100.

According to some embodiments of the present disclosure, the substrate may be formed of fine silver including a higher thermal conductivity than copper. According to still some embodiments, the self-operating switch 118 may be configured as the bimetal switch is attached to a connection member formed of fine silver, the connection member electrically connected to the conducting line. Alternatively, the connection member formed of fine silver, electrically connected to the conducting line, may be installed near the bimetal switch.

The self-operating switch 118 is in a closed state in a normal state when a ambient temperature is lower than a predetermined temperature (e.g., 85° C.), thereby supplying a DC power from the battery 120. On the other hand, if a ambient temperature is higher than or equal to the predetermined temperature (e.g., 85° C.), contacts of the self-operating switch 118 are open due to bending of the bimetal switch. Accordingly, the self-operating switch 118 interrupts the DC power supply from the battery 120.

An operation of the battery disconnect unit 100 according to some embodiments of the present disclosure when the vehicle is started, will be explained briefly with reference to FIGS. 3 and 2.

Firstly, the first main relay 111 turns into a closed state as a control signal of a square wave is applied from the controller (not shown) when the vehicle is started. Then, the pre-charge relay 114 turns into a closed state as a control signal of a pulse signal including a predetermined pulse width is applied from the controller at a time point (P1). As a result, the capacitor (C) is charged from the time point (P1), by a current (IS) supplied from the battery 120 and flowing to the capacitor (C) via the pre-charge relay 114.

Then, the second main relay 112 turns into a closed state as a control signal of a pulse signal type including a predetermined pulse width is applied from the controller at a time point (P2). If a predetermined time lapses from the time point (P2), the pre-charge relay 114 turns into an open state as the supply of the control signal is stopped.

As the second main relay 112 turns into a closed state, a direct current from the battery 120 flows into the inverter 130. In this case, as shown in FIG. 3, an inrush current may be generated at the time point (P2) when a control signal of the controller, the signal instructing a closed state of the second main relay 112 is applied to the second main relay 112 under the closed state of the pre-charge relay 114. In this case, the second main relay 112 does not turn completely into a closed state. The inrush current flows in a diverged manner into the pre-charge resistor (R) and the pre-charge relay 114 connected to the second main relay 112 in parallel. And the inrush current is consumed as thermal energy by the pre-charge resistor (R). Accordingly, the second main relay 112 is protected from the inrush current generated when the vehicle is started.

Hereinafter, a configuration of the battery disconnect unit 100 according to some embodiments of the present disclosure will be explained with reference to a detailed circuit diagram of FIG. 4.

Figure 4:
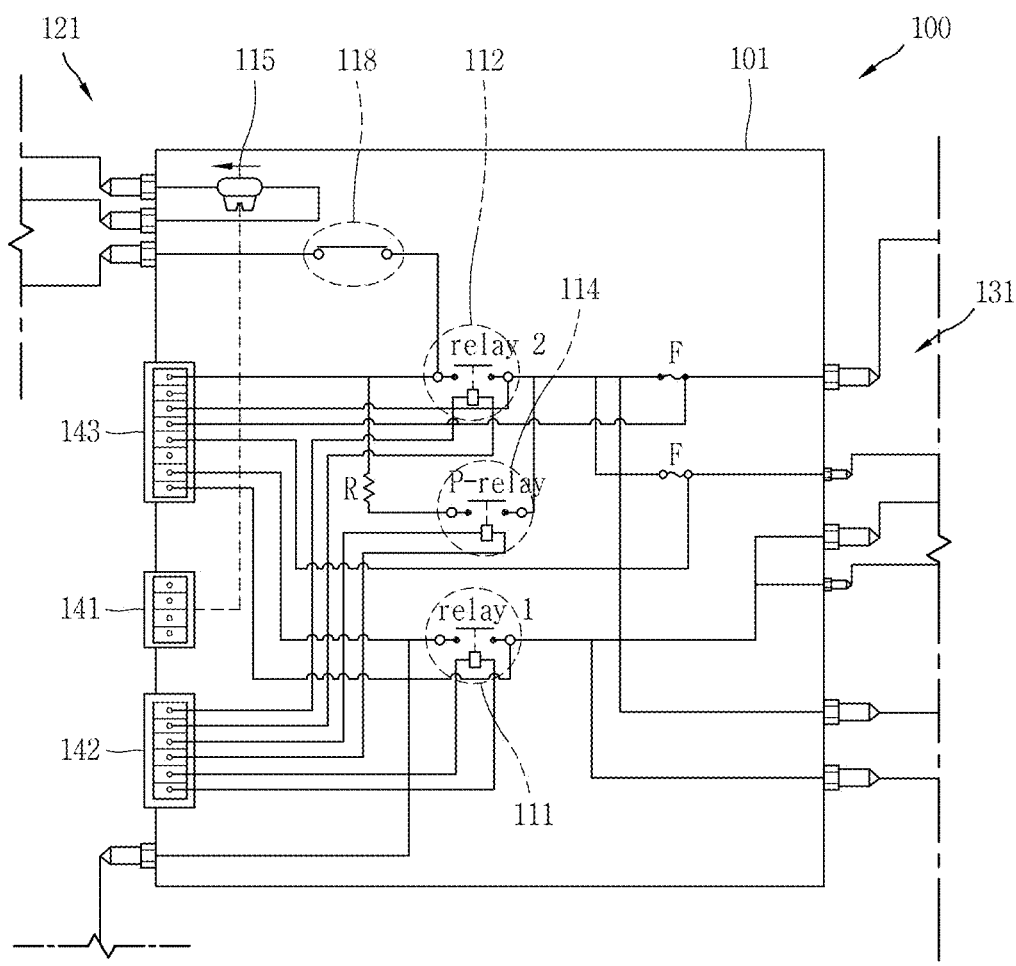
FIG. 4 is a circuit diagram illustrating a configuration of a detailed circuit of a battery disconnect unit according to some embodiments.

FIG. 4 is a circuit diagram illustrating a detailed configuration of a circuit of a battery disconnect unit according to some embodiments of the present disclosure.

Referring to FIG. 4, the battery disconnect unit according to some embodiments includes a case 101, a first main relay 111, a second main relay 112, a pre-charge relay 114, a pre-charge resistor (R), a current sensor (a current transformer) 115, a self-operating switch 118, a battery socket 121, an inverter socket 131, a current sensor terminal 141, a first control terminal 142, a second control terminal 143, and a fuse (F).

The case 101 includes a printed circuit board of the battery disconnect unit 100, and an enclosure of the battery disconnect unit 100.

As aforementioned, the first and second main relays 111, 112 include input terminals connected to an anode and a cathode of the battery 120, and output terminals connected to the inverter 130 of FIG. 2. And the first and second main relays 111, 112 may turn into a closed state for supplying a direct current from the battery 120 to the inverter 130, or in an open state for interrupting the supply of the direct current from the battery 120 to the inverter 130, according to a control signal from the controller.

As aforementioned, the pre-charge relay 114 turns into a closed state after the first main relay 111 turns into a closed state, when the vehicle is started. And the pre-charge relay 114 together with the pre-charge resistor (R) provides a conducting path such that an inrush current flows therethrough for a short time when the vehicle is started, thereby preventing damage of the second main relay 112 due to the inrush current.

The pre-charge resistor (R) is connected to the second main relay 112 in parallel, together with the pre-charge relay 114, thereby restricting (decreasing) the inrush current.

The current sensor 115, configured to detect the amount of current output from the battery 120, can be configured with a current transformer. And the current sensor 115 is installed between the battery 120 and the self-operating switch 118. The current sensor 115 may be connected to the current sensor terminal 141, and may be configured to output a current detection signal obtained through the current sensor terminal 141 and the current detection signal can indicate (represent) the amount of current supplied from the battery 120. The current detection signal may be transmitted to the controller of a battery management system (not shown), thereby being used to monitor a battery state.

As aforementioned, the self-operating switch 118 turns into a closed state in a normal state when a ambient temperature is lower than a predetermined temperature (e.g., 85° C.), thereby supplying a direct current from the battery 120. On the other hand, if a ambient temperature is equal to or higher than the predetermined temperature (e.g., 85° C.), contacts of the self-operating switch 118 are open due to bending of a bimetal. Accordingly, the self-operating switch 118 interrupts the supply of the DC power from the battery 120.

The battery socket 121 may be configured with a connector connected to the battery 120 through an external wire of the battery disconnect unit 100. And the battery socket 121 may be connected to the current sensor 115 and the self-operating switch 118, through an internal wire of the battery disconnect unit 100.

The inverter socket 131 as an output terminal of the battery disconnect unit 100 may be configured with a connector connected to the inverter 130.

The inverter socket 131 may include main connector and sub connector. The main connector includes input sides connected to the first and second main relays 111, 112 inside the battery disconnect unit 100, and includes output side connectable to the inverter 130. And the sub connector includes input sides connected to the first and second main relays 111, 112 inside the battery disconnect unit 100, and includes output side connectable to the capacitor (C) shown in FIG. 2.

The current sensor terminal 141 can be provided as a terminal to receive the current detection signal of the current sensor 115, and to transmit the received current detection signal to the controller.

The first control terminal 142 includes three pairs of terminals, and the pairs of terminals may be connected to coils of the first and second main relays 111, 112 and the pre-charge relay 114 inside the battery disconnect unit 100. And the pairs of terminals may be connected to the controller through external wires (not shown) of the battery disconnect unit 100.

Once a control signal is received from the controller by the first control terminal 142, the coil of a corresponding relay (e.g., the first main relay 111, the second main relay 112, or the pre-charge relay 114) is magnetized. As a result, the contacts of the first main relay 111, the second main relay 112, or the pre-charge relay 114 are closed. If no control signal is received from the controller by the first control terminal 142, the coil of a corresponding relay (e.g., the first main relay 111, the second main relay 112, or the pre-charge relay 114) is demagnetized. As a result, the contacts of the first main relay 111, the second main relay 112, or the pre-charge relay 114 are open.

The second control terminal 143 can be configured with four pairs of terminals. Each of the pair of terminals may be connected to two ends of contacts of the first main relay 111 or the second main relay 112 or the pre-charge relay 114 inside the battery disconnect unit 100 or an outlet of the fuse (F). Accordingly, the second control terminal 143 may transmit information about a current open or closed state of the first main relay 111, the second main relay 112 and the pre-charge relay 114, and information about whether the fuse (F) includes melted or not, to the controller, as for example a voltage signal.

The fuse (F) may include a fuse connected between the second main relay 112 and the inverter socket 131, and a fuse connected between the second main relay 112 and the sub connector.

The outlet of each fuse (F) may be connected to the second control terminal 143, thereby transmitting an information signal indicating whether the fuse (F) includes melted or not, to the controller through the second control terminal 143.

Each fuse (F) melts to be cut-out when an over-current is generated on a circuit between the second main relay 112 and the inverter socket 131, or when an over-current is generated on a circuit between the second main relay 112 and the sub connector, thereby protecting devices connected to the circuit from the over-current.

The internal wire of the battery disconnect unit 100 may be configured with one or more bus-bars assembled with each other in the case 101, not general lead wires. The bus-bar includes a shape that a conductive thin plate extends, and may be formed of a metallic material including conductivity, e.g., copper or aluminum. Since such a bus-bar includes a higher rigidity than a general lead wire, it may maintain its shape and connected state unless a strong external force is applied thereto. Accordingly, such a bus-bar may be utilized to an electric vehicle.

As aforementioned, the battery disconnect unit of some embodiments of the present disclosure includes the self-operating switch for interrupting a circuit by being autonomously operated without an additional power source and without an additional circuit for recognizing and controlling a temperature, when electronic components are not normally operated as a ambient temperature of the battery disconnect unit is increased by equal to or more than a predetermined temperature value, or when an over-current occurs. This may prevent damage or mal-operation of the battery disconnect unit and electric (electronic) components of the inverter connected to the battery disconnect unit even in a standby state without an electric power source, the damage or mal-operation occurring when a ambient temperature is drastically increased or when an over-current occurs. Further, this may reduce maintenance costs of a driving and control system in an electric vehicle.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A battery disconnect unit comprising:
   a first main relay electrically connected between a first pole of a battery and an inverter;
   a second main relay electrically connected between a second pole of the battery and the inverter;
   a pre-charge relay connected to the second main relay in parallel;
   a self-operating switch connected between the first pole of the battery and the second main relay, and configured to autonomously open a circuit providing electric power from the battery to the second main relay and to interrupt the supply of the electric power from the battery without an additional controlling circuit, when an ambient temperature reaches or exceeds a temperature threshold, or when an over-current occurs; and
   a fuse disposed between the battery and the inverter, and configured to melt when the over-current occurs on a circuit inside the battery disconnect unit,
   wherein the self-operating switch is configured to:
      autonomously open the circuit when the fuse is not disconnected despite the over-current applied thereto; and
      protect the fuse by opening the circuit before the fuse melts when the over-current less than an operating current of the fuse occurs.

2. The battery disconnect unit of claim 1, wherein the self-operating switch comprises a bimetal switch configured to open when the ambient temperature reaches or exceeds the temperature threshold.

3. The battery disconnect unit of claim 1, further comprising a substrate connected to the self-operating switch, formed from a thermally conductive material, and configured to accelerate a circuit opening speed of the self-operating switch when a temperature increase occurs.

4. The battery disconnect unit of claim 3, wherein the substrate comprises a copper plate.

5. The battery disconnect unit of claim 3, wherein the substrate comprises a fine silver plate.

6. The battery disconnect unit of claim 1, further comprising a relay state output terminal connected across both ends of contacts of each of the first main relay, the second main relay and the pre-charge relay, and configured to transmit a switching state information of each of the first main relay, the second main relay and the pre-charge relay.

7. The battery disconnect unit of claim 1, further comprising:
   a fuse state output terminal connected to the fuse and configured to output an information signal indicating whether the fuse has melted or not.

* * * * *